(12) United States Patent
Mielke et al.

(10) Patent No.: US 8,616,570 B2
(45) Date of Patent: Dec. 31, 2013

(54) METHOD FOR PRODUCING A CONTROL ARM, AND A CONTROL ARM

(75) Inventors: Oliver Mielke, Altenbeken (DE); Roald Pedersen, Gjovik (NO); Uwe Koch, Schloss Holte (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/299,478

(22) Filed: Nov. 18, 2011

(65) Prior Publication Data

US 2012/0299263 A1 Nov. 29, 2012

(30) Foreign Application Priority Data

Nov. 19, 2010 (DE) .......................... 10 2010 051 741

(51) Int. Cl.
  *B60G 3/04* (2006.01)
  *B60G 7/00* (2006.01)
(52) U.S. Cl.
  USPC ..................................... 280/124.134; 72/254
(58) Field of Classification Search
  USPC ..................................... 280/124.134; 72/254
  See application file for complete search history.

(56) References Cited

U.S. PATENT DOCUMENTS

| | | | | |
|---|---|---|---|---|
| 5,169,055 | A | * | 12/1992 | Peterson et al. ............... 228/170 |
| 5,992,867 | A | * | 11/1999 | Kato et al. ............. 280/124.134 |
| 6,006,568 | A | * | 12/1999 | Bihrer ................................ 72/60 |
| 6,099,084 | A | * | 8/2000 | Bungarten et al. ............ 301/127 |
| 6,810,586 | B1 | * | 11/2004 | Waaler et al. ................. 29/897.2 |
| 8,025,301 | B2 | * | 9/2011 | Guttilla et al. ......... 280/124.134 |
| 2008/0001378 | A1 | * | 1/2008 | Schmitz et al. ........ 280/124.134 |
| 2009/0072506 | A1 | | 3/2009 | Jang et al. |

FOREIGN PATENT DOCUMENTS

| | | |
|---|---|---|
| DE | 102008047015 | 7/2006 |
| DE | 112005002470 | 9/2007 |
| EP | 1336514 | 8/2003 |
| EP | 1 642 754 | 4/2006 |
| WO | WO 95/13931 | 5/1995 |
| WO | WO2006046876 A1 | 5/2006 |

* cited by examiner

*Primary Examiner* — Ruth Ilan
*Assistant Examiner* — Darlene P Condra
(74) *Attorney, Agent, or Firm* — Henry M. Feiereisen LLC

(57) ABSTRACT

In a method for producing a control arm for arrangement on an automobile axle formed as one-piece part from a light-metal extruded profile, a semi-finished product made from a light-metal extruded profile having a Pi-shaped cross-sectional configuration with a bottom web, side webs extending from the bottom web, and legs projecting from the webs is processed by cutting, whereafter bearing seat openings are introduced and sections of the processed semi-finished product are expanded. A control arm produced with the method of the invention for arrangement on an automobile axle is also disclosed.

18 Claims, 4 Drawing Sheets

METHOD FOR PRODUCING A CONTROL ARM, AND A CONTROL ARM

CROSS-REFERENCES TO RELATED APPLICATIONS

This application claims the priority of German Patent Application, Serial No. 10 2010 051 741.0, filed Nov. 19, 2010, pursuant to 35 U.S.C. 119(a)-(d), the content of which is incorporated herein by reference in its entirety as if fully set forth herein.

BACKGROUND OF THE INVENTION

The present invention relates to a method for producing a control arm for arrangement on an automobile axle and to a control arm for arrangement on an automobile axle.

The following discussion of related art is provided to assist the reader in understanding the advantages of the invention, and is not to be construed as an admission that this related art is prior art to this invention.

Axle components in form of tie rods, control arms or coupling rods are used to transmit static and dynamic wheel forces to an auxiliary axle frame or to an automobile body. These axle components are hereby rotatably and/or pivotally coupled between wheel supports and support locations on the vehicle. The coupling occurs mostly by way of rubber-metal bearings.

The wheel forces to be transmitted have hereby a peak range of up to several thousand Newton, so that the wheel guiding control arms must be able to withstand high and strong peak loads as well as continuous vibrational loads. The wheel guiding control arms are additionally subjected to strong vibrations resulting from different driving conditions, in particular uneven road surfaces, but also unbalances on a vehicle wheel.

The dynamic driving profile required for modern automobiles necessitates the use of particularly lightweight components on the side of the unsprung masses. In addition, automobile manufacturer are continuously required to reduce the overall vehicle weight in order to reduce fuel consumption and $CO_2$ emission.

Conventional control arms are largely constructed as steel components, so that they can satisfy the requirements of low weight, high stiffness, long service life and advantageous manufacturability. For example, multi-part control arms made of steel typically have an upper shell and a lower shell, to which different bearing seats, spring seats or damper seats are attached. A control arm of this type is typically finished with weld joints. Producing a robust component with a long service life requires numerous process steps as well as extensive anticorrosion post-treatment.

Disadvantageously, the hardened structure of welded assemblies fundamentally changes in the region of the weld seam and in the zone around the weld seam affected by the heat. A clean welding result is frequently difficult to achieve in particular with components having a complex geometry. Disadvantageously, welded steel structures are also susceptible to corrosion. Although the weld seams increase the stiffness when the different components are joined to form a control arm, the weight of the component itself also increases due to the additional welding material.

Control arms can also be manufactured cost-effectively by molding, for example casting. Control arms with an X-shaped structure can be formed in this way. Complex geometrical shapes are possible by casting, which are not possible with a welded steel structure. For example, control arms in form of hollow aluminum parts are produced by casting. Lost cores, for example sand cores and the like, are mostly used for the hollow space. Disadvantageously, control arms produced by casting, in particular as a hollow component, have a high production tolerance. For supporting the cores enclosed in cast components, it may sometimes be necessary to leave the exterior sides open, which may adversely affect the torsional stiffness of such profile components.

Another disadvantage of cast components is a high porosity of the component itself. This results in a lower strength compared to, for example, components processed by forming. In most cases, a subsequent forging process is used for increasing the strength of cast components. However, the forging process itself in turn increases the production costs of the component, as well as reduces the degrees of freedom in the production.

Control arm with variable curvature can also be produced by extrusion. However, the extrusion process is difficult to control.

It would therefore be desirable and advantageous to obviate prior art shortcomings and to provide an improved method for producing a control arm, as well as a control arm which can be produced more cost-effectively compared to conventional production methods, while simultaneously providing high stiffness of the control arm and in particular good dimensional accuracy.

SUMMARY OF THE INVENTION

According to one aspect of the present invention, a method according to the invention for producing a control arm for arrangement on an automobile axle wherein the control arm is produced as a one-piece part formed from a light-metal extruded profile, includes the steps of providing a semi-finished product from a light-metal extruded profile, which has a Pi-shaped cross-sectional configuration with a bottom web and side webs extending from the bottom web and legs projecting from the webs, processing the semi-finished product by cutting, introducing bearing seat openings, and expanding the processed semi-finished product in predetermined sections.

The light-metal extruded profile with a Pi-shaped cross-section has a structure resembling the capital Greek letter Pi. The profile is also open towards all sides and has corresponding webs and legs which increase the elastic modulus with respect to bending in the corresponding orientation direction of the webs or legs. Because the profile itself is open on all sides, it can be particularly easy processed, because only small forming forces need to be applied and the profile can be easily deformed.

Due to the geometric design of the profile, forming tools can be applied to the profile or inserted into the profile from several positions. The method according to the invention thus provides particularly cost-effective manufacturability, because the tools can be inserted into the workpiece in different insertion positions. The tools can also be brought into advantageous positions for applying a force when performing the method, due to the openness of the profile with the Pi-shaped cross-section. This increases the manufacturing accuracy of the control arm produced by the method according to the invention.

Advantageously, the method according to the invention can be varied in many ways. The wall thicknesses of the profile can be adapted to specific requirements. This means, the thicknesses may be different across the area and/or jumps or transitions in the thickness may occur, so as to optimally satisfy the respective resistance moments against bending or torsion. The control arm is brought into its final form by using typical industrial forming and manufacturing methods, for example bending, cutting, punching and the like.

According to an advantageous feature of the present invention, the profile may be spread apart or expanded in individual sections. In one embodiment, the employed semi-finished product may extruded and subsequently quenched, stretched and cut off into individual sections.

According to another advantageous feature of the present invention, the side webs and/or legs may be processed by cutting at least in sections. Advantageously, cutting may involve punching. In this way, the profile of the semi-finished product having a Pi-shaped cross-section may be prepared by punching so that subsequent forming operations can be easily performed. Processing by punching makes it possible to also prepare the bottom web, so that openings may be punched in the bottom web, while simultaneously cutting off the side webs. The semi-finished product is then optimally prepared for the available required kinematic freedom of movement of the control arm produced according to the invention.

According to an advantageous feature of the present invention, at least one end section of the semi-finished product may be processed by forming. This involves, on one hand, preparing the end section itself with seats for, for example, rubber metal bearings or other attachment bearing seats, which are in turn processed by forming for receiving a bearing location or are bent into a bearing seat geometry. For example, the legs may be bent together by forming, or passages may be prepared at bearing seat locations.

According to another advantageous feature of the present invention, an end section of the semi-finished product may formed at least in sections by stretch-bending; preferably, the end section may be bent in the direction of the bottom web. Stretch-bending, preferably in the direction of the bottom web, optimally utilizes the Pi-shaped profile. This prevents overstressing the material, especially in the region of the bottom web or the side webs, because the bending axis is substantially transverse to the longitudinal direction of the semi-finished product and is therefore bent about the bottom web. Subsequently, mainly the sections of the respective legs distal from the bottom web are expanded. Due to the cross-sectional profile, the control arm to be produced can therefore be optimally formed by applying small forming forces, while simultaneously building up only low stress inside the component and later optimally using the available installation space.

Additionally, bearing seat openings may advantageously be introduced into the bottom web and/or the legs and/or the side webs by punching. In this way, various openings may be introduced using only a single process step. A corresponding punching tool may be employed, for example in the region of the bottom web, in one movement direction from above, and for the legs in a movement direction from the side.

According to another advantageous feature of the present invention, the bearing seat openings may be post-processed, in particular for forming, preferably through expansion. This creates a configuration of the bearing seat openings optimized for force absorption. A preliminary punched opening for a bearing eye is then transformed to the final configuration through expansion. The profile itself requires more material due to the expansion process itself compared to a method where the bearing eye is directly punched out with the final configuration. Material requirement refers hereby to an improved use of material or material savings. In the following, a force-optimized geometry is attained, because more material is available for absorbing and transmitting force.

According to another advantageous feature of the present invention, the legs and/or the side webs may be formed at least in sections in the longitudinal direction of the produced control arm; preferably, the opposing legs may be formed over the side webs in the end section with an orientation towards each other. In this way, an optimal geometry is attained in the region where the control arm to be produced is attached to an auxiliary axle frame, a wheel carrier or an automobile body, without loss of strength.

According to yet another advantageous feature of the present invention, for example damper seats, spring seats or other seat locations or a center section may be expanded so as to increase the bending stiffness and/or torsional stiffness of the control arm to be produced. in one embodiment, the cross-sectional profile of the semi-finished product may be expanded at least in sections by expanding the legs and/or side webs.

According to another advantageous feature of the present invention, two control arms which are then separated after manufacture may be produced simultaneously using a single tool. This means within the context of the invention that two semi-finished products and/or processed semi-finished products are separated during the manufacture. Alternatively, the forming and manufacturing process may first be completely finished, whereafter the two finished control arms are separated. In particular, the cycle time for producing a control arm according to the invention is thereby advantageously cut in half, thus significantly reducing the modification and/or production costs of a tool for producing two control arms manufactured, for example, with two separate tools.

According to another aspect of the invention, a control arm for arrangement on an automobile axle has at least in sections a Pi-shaped cross-sectional configuration with a bottom web, side webs extending as an extension of the bottom web, and legs projecting from the webs, wherein the control arm is produced from a light-metal extruded profile as a one-piece formed part by processing a semi-finished product by cutting, introducing bearing seat openings, and expanding the processed semi-finished product in sections. The control arm according to the invention has a cross-sectional profile which is expanded at least in certain sections.

Within the context of the invention, the expansion along the cross-sectional profile is to be understood more particularly as an expansion of the profile having a Pi-shaped cross-section in the region of the legs. The legs are then formed so as to move away from each other, forming an expansion of the profile in one section. Expansion hereby results in extreme material savings, with resulting weight and cost savings. This is also particularly advantageous for possible attachment of the damper seats, springs, etc. In this way, in particular damper seats, springs and other mounting bodies can be attached without adversely affecting the stiffness.

According to an advantageous feature of the present invention, a trapezoidal shape in a control arm is formed in a center section by the bottom web and the side webs extending from the bottom web. The trapezoidal shape provides a wide receiving surface for any attached components and simultaneously increases the bending stiffness in the plane of the bottom web.

According to another advantageous feature of the present invention, the legs and the side webs of a control arm may be formed with a trapezoidal taper at least in one end section. In this way, only a narrow surface must be available at a bearing attachment location for the bearing seat. The control arm according to the invention thus makes optimal use of the available space while simultaneously exhibiting an optimal stiffness characteristic in all bending directions.

The legs of the control arm furthermore may have a distance in the expanded section, wherein the distance is greater than the distance of the legs in adjacent sections. This also ensures that the cross-section is expanded along the profile of the control arm, so that attached components can be suitably mounted.

According to another advantageous feature of the present invention, the legs in the tapered end section may have a distance, wherein the distance is smaller than the distance of the adjacent section. Similar advantages for possible attachment at bearing locations are hereby attained.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4a is a cross-section of the control arm, taken along the line A-A in FIG. 4;

FIG. 4b is a cross-section of the control arm, taken along the line B-B in FIG. 4;

FIG. 4c is a cross-section of the control arm, taken along the line C-C in FIG. 4; and FIG. 4d is a cross-section of the control arm, taken along the line D-D in FIG. 4.

DETAILED DESCRIPTION OF PREFERRED EMBODIMENTS

Figure 1:
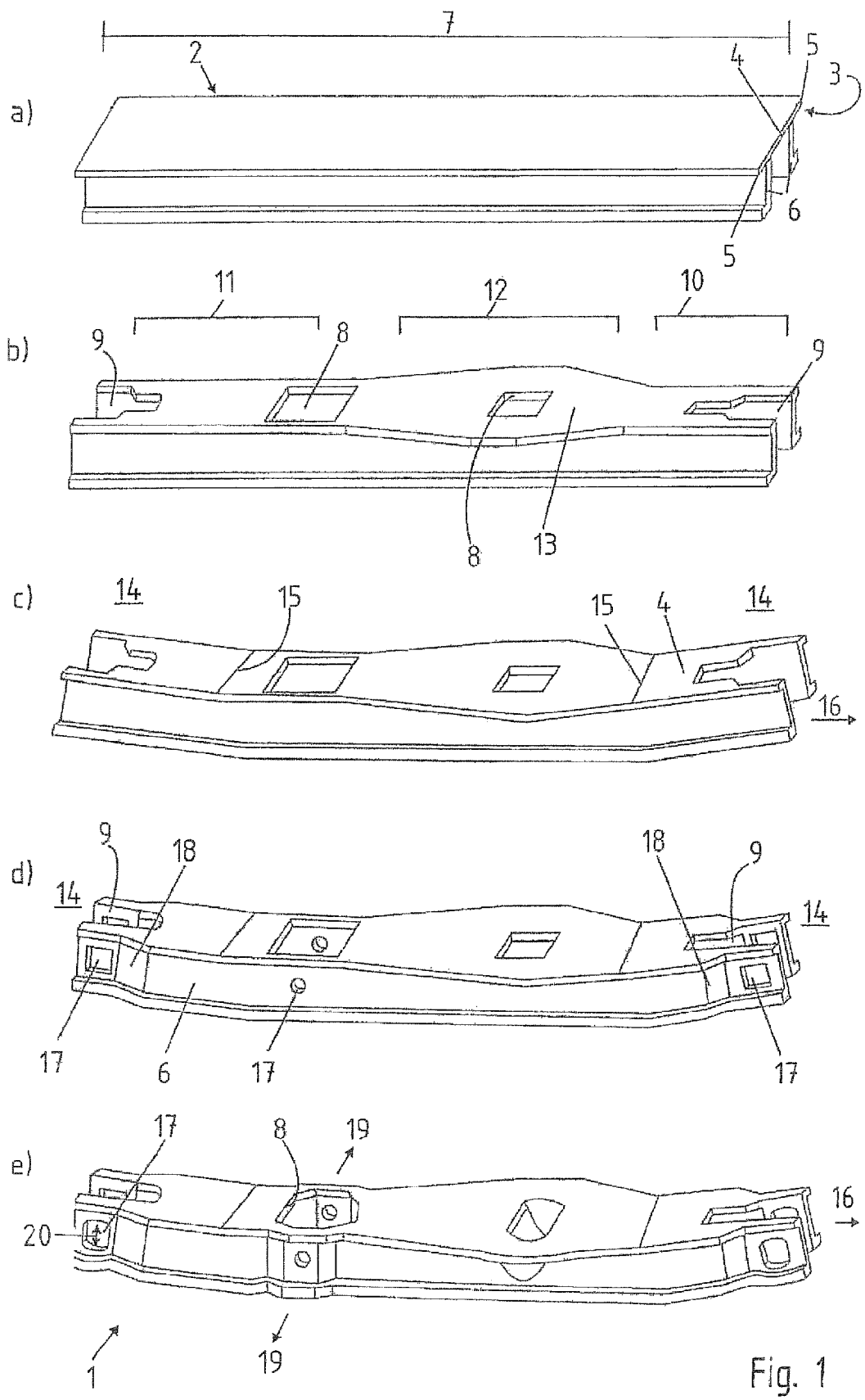
FIGS. 1a)-1e) show various steps of a production method according to the invention with the individual method steps.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a production method according to the invention for a control arm 1. FIG. 1 is divided into FIGS. 1a) to 1e). FIG. 1a) shows a semi-finished product 2 with a cross-sectional Pi-shaped configuration 3. The semi-finished product 2 has a bottom web 4, side webs 5 extending laterally from the bottom web in the direction of the bottom web 4, and legs 6 projecting with respect to the bottom web 4. The semi-finished product 2 has in the longitudinal direction a length 7 which corresponds substantially to the length of the produced control arm 1.

In FIG. 1b), a first process step has been performed, wherein the bottom web 4 and the side webs 5 were processed by cutting. Particularly preferred, processing by cutting is performed by punching, whereby mounting openings 8 and processing openings 9 are introduced in the bottom web 4. The side webs 5 are each cut off in a front section 10 and in a rear section 11. The bottom web 4 and the side webs 5 form a trapezoidal shape 13 in a center section 12.

FIG. 1c) shows an additional process step, wherein the end sections 14 of the semi-finished product 2 are formed by stretch-bending. A corresponding bending axis 15 hereby extends essentially transversely to the longitudinal axis 16 of the workpiece to be produced. The end sections 14 are bent in the direction toward the bottom web 4.

FIG. 1d) shows an additional process step, wherein bearing seat openings 17 are introduced in the legs 6 with an additional cutting and/or punching process. In an additional process step performed in parallel with the process step for introducing the bearing openings, the end sections 14 are formed with a trapezoidal taper. This means that the legs 6 of the end sections 14 are pressed together accordingly, thus forming a trapezoidal transition section 18 to the end sections 14. The processing openings 9 are hereby formed so as to facilitate the formation of a trapezoidal taper of the end sections 14 by forming.

In another process step, the cross-sectional profile is expanded in the region of the mounting openings 8 at least in sections. The expansion hereby takes place in an expansion direction 19, wherein the expansion direction 19 extends essentially transversely to the longitudinal axis 16 of the control arm 1. The bearing seat openings 17 are then also formed into their final configuration by expansion. The expansion hereby takes place in a bearing expansion direction 20, wherein the bearing expansion direction 20 is also oriented substantially transversely to the longitudinal axis 16 of the control arm 1.

Figure 2:
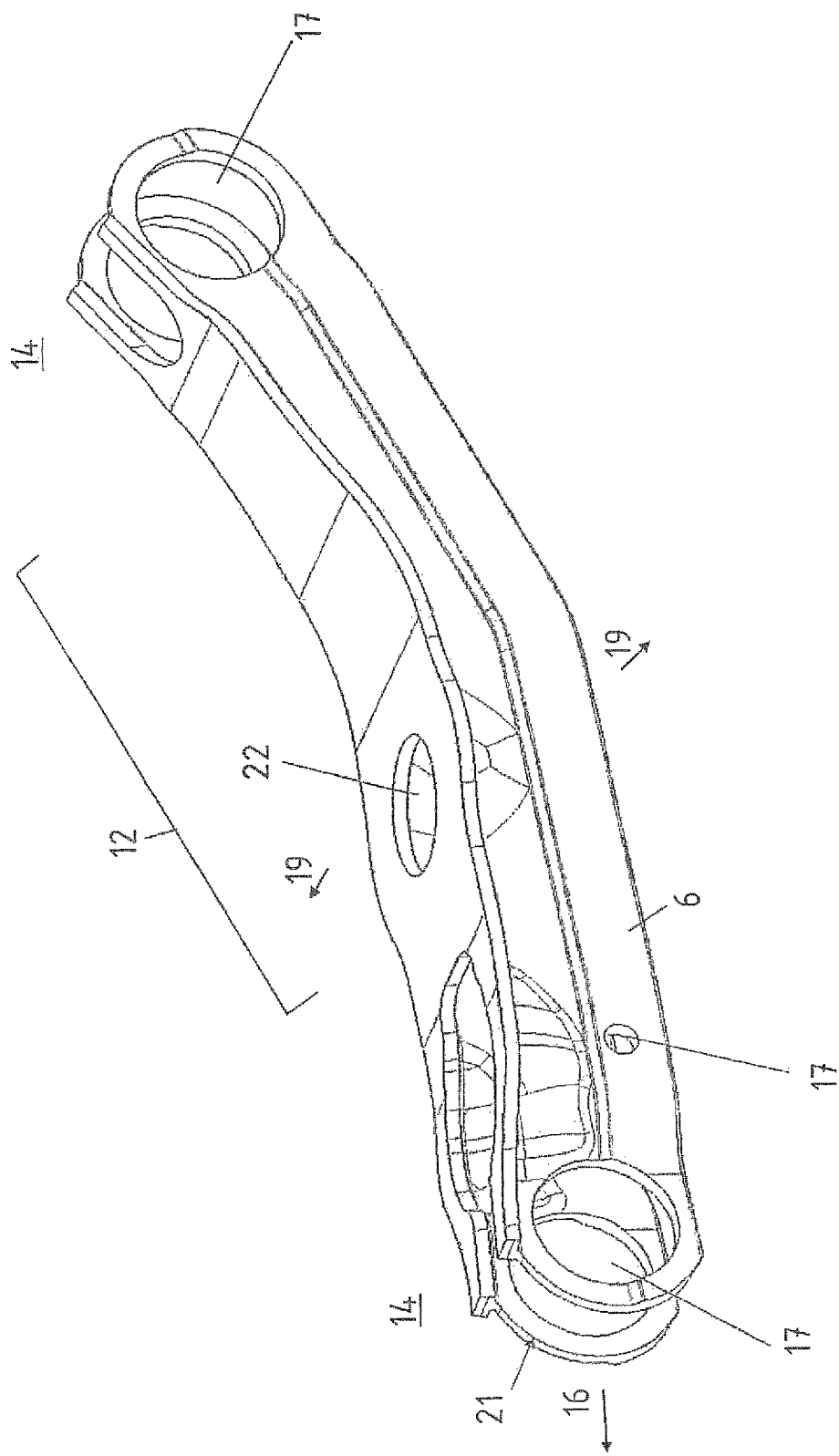
FIG. 2 is a perspective view of a control arm according to the invention.

FIG. 2 shows another embodiment of the control arm 1 according to the invention produced with the method of the invention. Each of the end sections 14 of the control arm 1 according to FIG. 2 has rounded legs 21. The legs 6 hereby each enclose a bearing seat opening 17. The bearing seat opening 17, which is not illustrated here, may also include passages. The control arm 1 according to FIG. 2 has a reinforcement profile 22 in a center section 12. The reinforcement profile 22 is hereby expanded in the region of the legs 6 in an expansion direction 19 oriented substantially transversely to the longitudinal axis 16. The control arm is also expanded in the region of the left seat opening (in relation to the drawing plane) in the region of the legs 6.

Figure 3A:
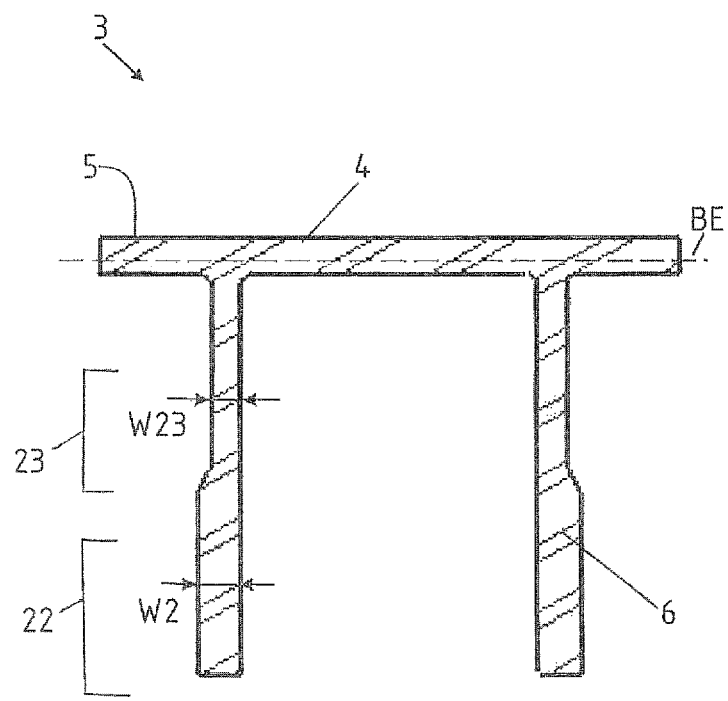
FIG. 3a, 3b show two different Pi-shaped cross-sectional profiles according to the invention.
Figure 3B:
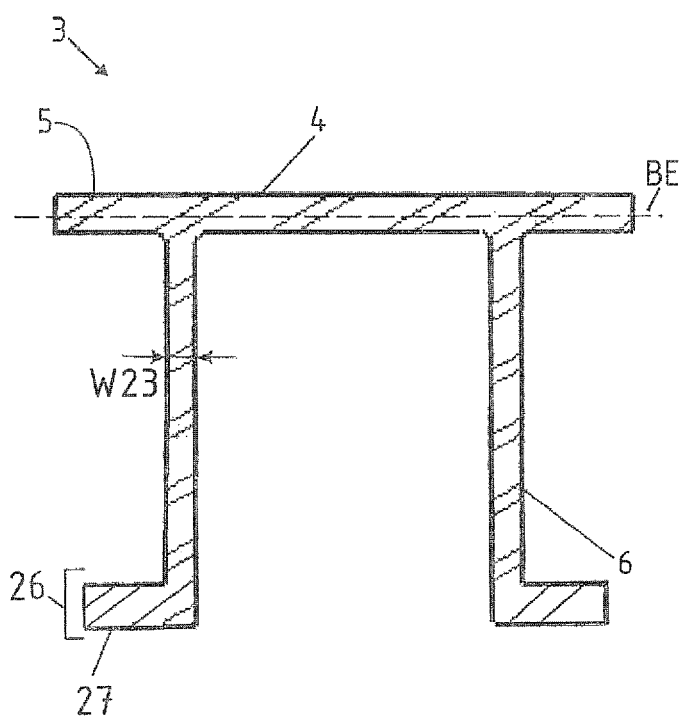

FIG. 3a shows the Pi-shaped cross-sectional profile 3 according to the invention of the semi-finished product. As can be seen, the bottom web 4 has side webs 5 extending in the direction of the plane BE of the bottom web. Moreover, legs 6 are formed which protrude from the bottom web 4 and have in a lower section 23 a greater wall thickness W23 than the wall thickness W24 in an upper section 24. The legs 6 can thus be designed commensurate with the stiffness or strength requirement, for example in form of (unillustrated) bearing seat openings in the lower section 23 of the legs 6. FIG. 3b also shows an embodiment of an extruded profile with a Pi-shaped cross-section, wherein the legs 6 have a constant wall thickness along their entire extent and have additionally a flange 27 in the foot region 26.

Figure 4:
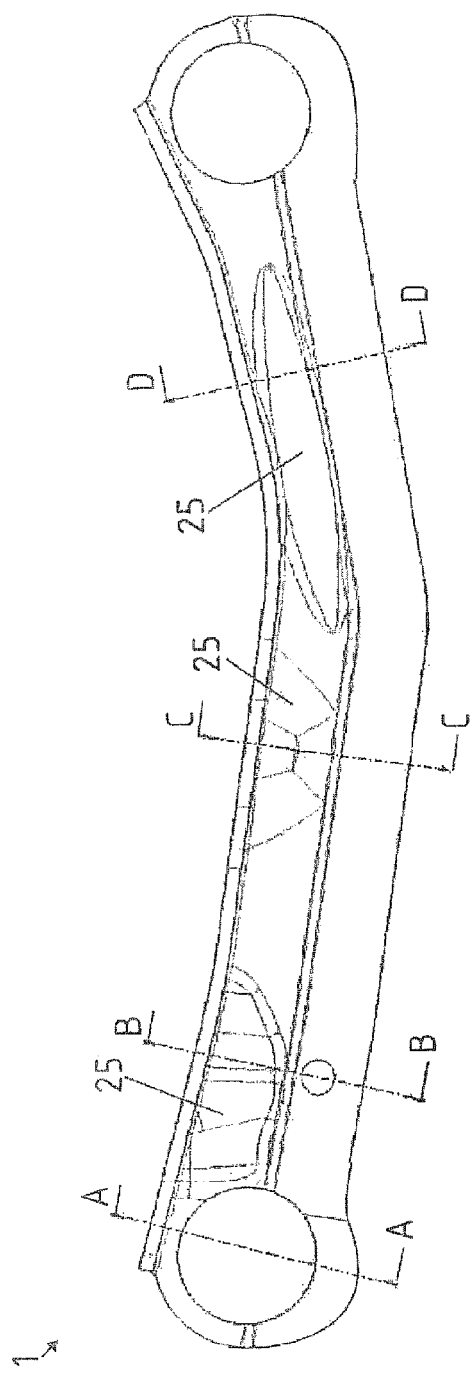
FIG. 4 is a schematic illustration of a control arm according to the invention.
Figure 4:
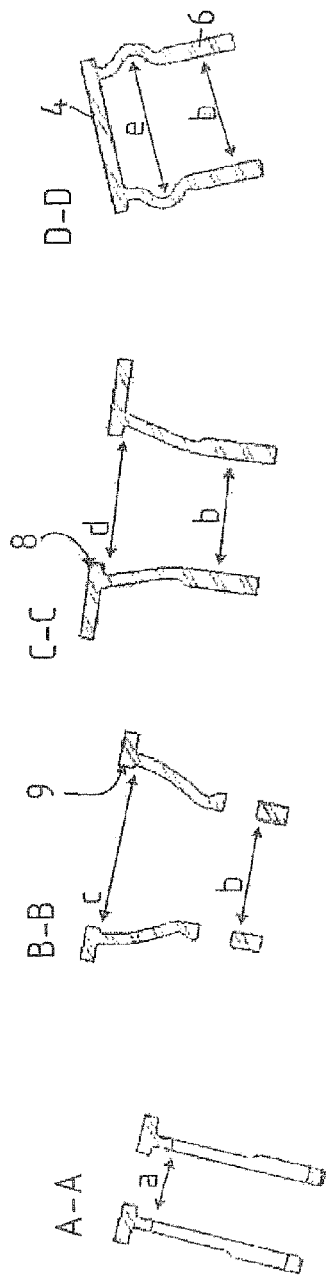

FIG. 4 shows another embodiment of a control arm 1 according to the invention with different cross-sectional views of the profile taken along the cutting lines A-A, B-B, C-C and D-D, as shown in FIGS. 4a, 4b, 4c, 4d, respectively. As can be readily seen, the cutting lines B-B, C-C and D-D each have an expanded section 25 in the region of the legs 6. The expanded section 25 particularly aids to stiffen the control arm 1 produced according to the invention. With the Pi-shaped cross-sectional profile 3, a forming tool can advantageously be inserted with an expansion tool either in the direction of the bottom web 4, or an opening in form of a mounting opening 8 or in form of a processing opening 9, thus expanding the bottom web 4 in this region. With respect to the cutting line D-D, a forming tool can be inserted through the legs 6 which are open towards the bottom, whereby the legs can be formed in this region commensurate with a stiffening and/or reinforcement.

FIG. 4 also shows a distance a in the cutting line A-A, wherein the distance a is smaller than a distance b. The distance b hereby corresponds to the original distance of the legs of the Pi-shaped cross-sectional profile. In addition, the cross-sectional profile has in the expanded section of the cutting line B-B an upper distance c and in the cutting line C-C an upper distance d and in the cutting line D-D a distance e. The distances c, d, e are hereby always greater than the distance b.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for producing a one-piece control arm from a light-metal extruded profile having a longitudinal length for arrangement on an automobile axle, the method comprising the steps of:
    providing a semi-finished product from a light-metal extruded profile with a Pi-shaped cross-sectional configuration along the longitudinal length including a bottom web, side webs extending from the bottom web, and legs projecting from the webs,
    processing the semi-finished product by cutting,
    introducing bearing seat openings, and
    expanding predetermined sections along the longitudinal length of the processed semi-finished product, wherein a distance between legs of an expanded cross-sectional profile in one section along the longitudinal length is greater than a distance between legs in an adjacent section along the longitudinal length of the processed semi-finished product.

2. The method of claim 1, wherein at least sections of at least one of the side webs and the legs are cut off during processing.

3. The method of claim 2, wherein the sections are cut off by punching.

4. The method of claim 1, and further processing at least one end section of the semi-finished product by forming.

5. The method of claim 4, wherein the at least one end section of the semi-finished product is formed by at least one of bending and stretch-bending.

6. The method of claim 5, wherein the at least one end section is bent in a direction of the bottom web.

7. The method of claim 1, wherein the bearing seat openings are introduced in at least one of the bottom web, the legs and the side webs by punching.

8. The method of claim 7, wherein the bearing seat openings are post-processed.

9. The method of claim 8, wherein the bearing seat openings are post-processed by forming.

10. The method of claim 8, wherein the bearing seat openings are post-processed by expansion.

11. The method of claim 1, wherein at least one of the legs and the side webs are formed at least in sections.

12. The method of claim 11, wherein opposing legs and opposing side webs in at least one end section of the semi-finished product are formed so as to be oriented towards each other.

13. The method of claim 1, wherein the cross-sectional profile of the semi-finished product is expanded at least in the predetermined sections by expanding at least one of the legs and the side webs.

14. The method of claim 1, wherein two control arms are produced using a single tool and separated while the two control arms produced or after the two control arms are produced.

15. A control arm for arrangement on an automobile axle, comprising:
    an extruded profile having a longitudinal length and at least in parts a Pi-shaped cross-sectional configuration with a bottom web, side webs extending as an extension of the bottom web, and legs projecting from the side webs,
    wherein the cross-sectional profile of the control arm is expanded at least in predetermined sections along the longitudinal length and
    wherein a distance between legs of the expanded cross-sectional profile in one section along the longitudinal length is greater than a distance between legs in an adjacent section along the longitudinal length.

16. The control arm of claim 15, wherein the bottom web and the side webs form a trapezoidal shape located in a center section of the control arm.

17. The control arm of claim 15, wherein at least an end section of the legs and the side webs has a trapezoidal taper.

18. The control arm of claim 17, wherein the legs in the tapered end section have between the legs a distance which is smaller than a distance between the legs of an adjacent section.

* * * * *